Oct. 19, 1948.                L. H. DONNELL ET AL                2,451,815
                                    AIRSHIP
Original Filed July 16, 1941                                6 Sheets-Sheet 1
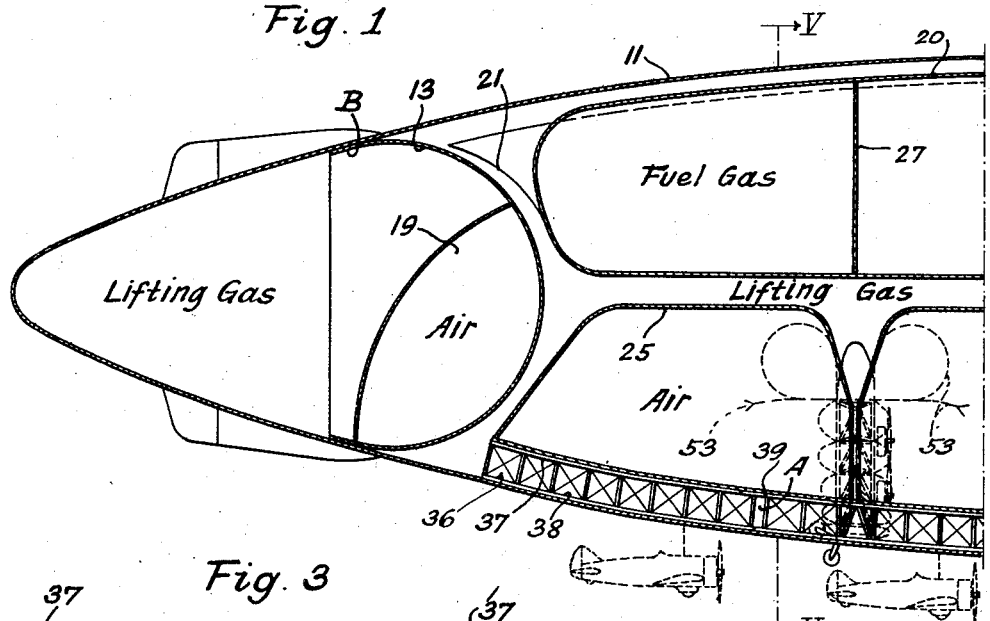
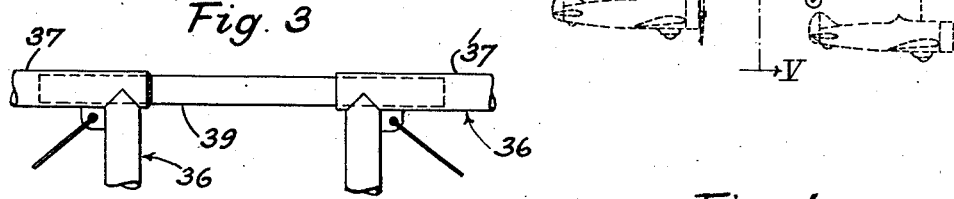
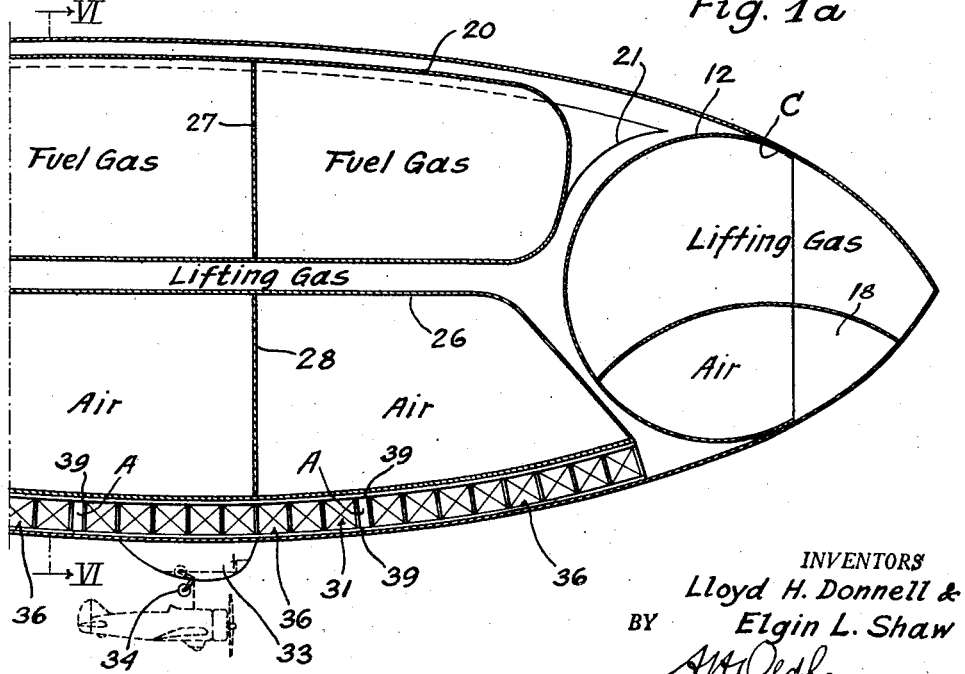
INVENTORS
Lloyd H. Donnell &
BY    Elgin L. Shaw
        *AH Oldham*
            ATTORNEY Oct. 19, 1948.  L. H. DONNELL ET AL  2,451,815
AIRSHIP
Original Filed July 16, 1941  6 Sheets-Sheet 2

INVENTOR.
Lloyd H. Donnell &
BY   Elgin L. Shaw
ATTORNEY

Oct. 19, 1948.  L. H. DONNELL ET AL  2,451,815
AIRSHIP
Original Filed July 16, 1941  6 Sheets-Sheet 3

Inventor
Lloyd H. Donnell
Elgin L. Shaw

Attorney

Oct. 19, 1948.    L. H. DONNELL ET AL    2,451,815
AIRSHIP
Original Filed July 16, 1941    6 Sheets-Sheet 4

INVENTORS
Lloyd H. Donnell &
BY   Elgin L. Shaw
A.H. Oldham
ATTORNEY

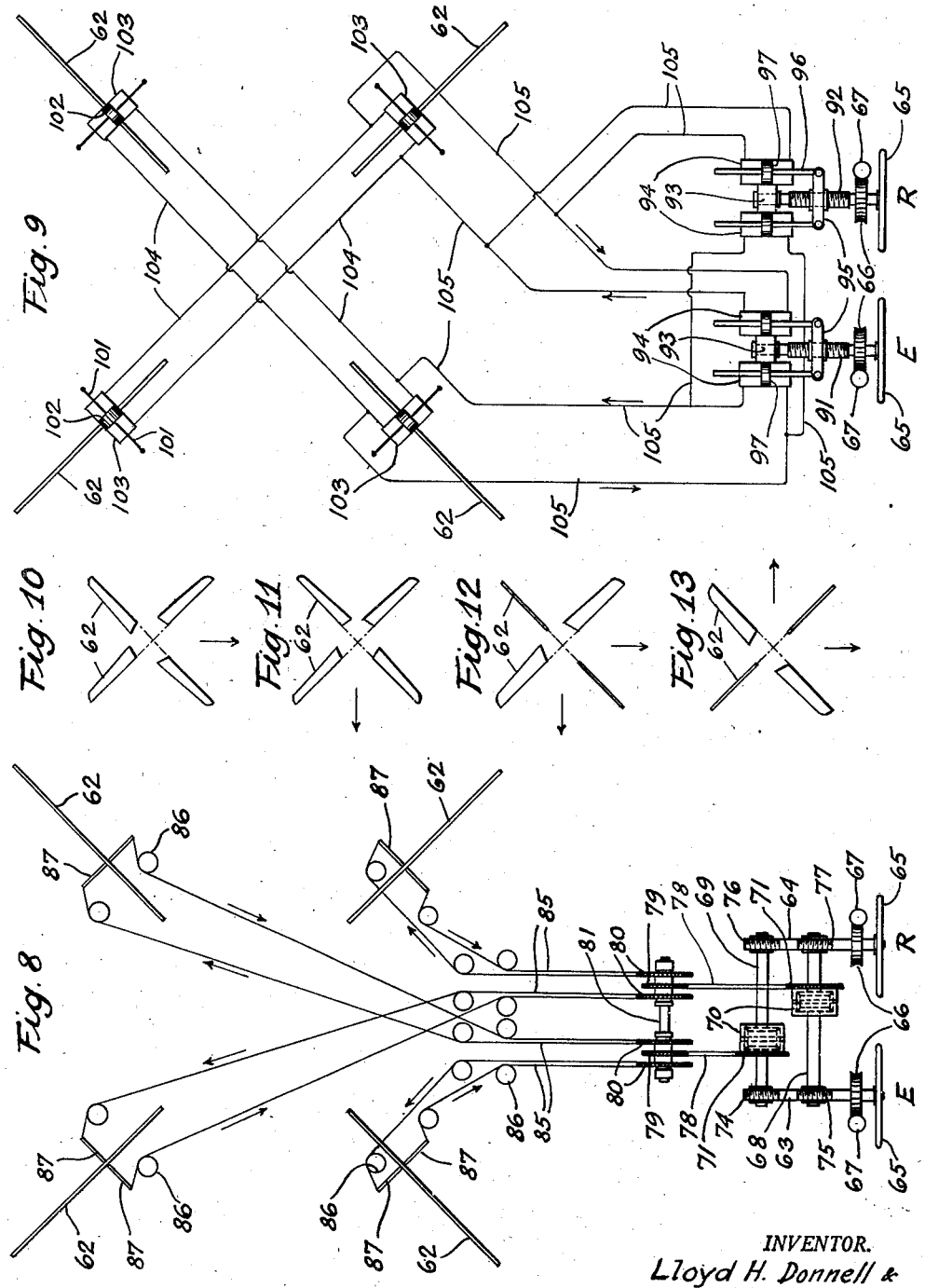

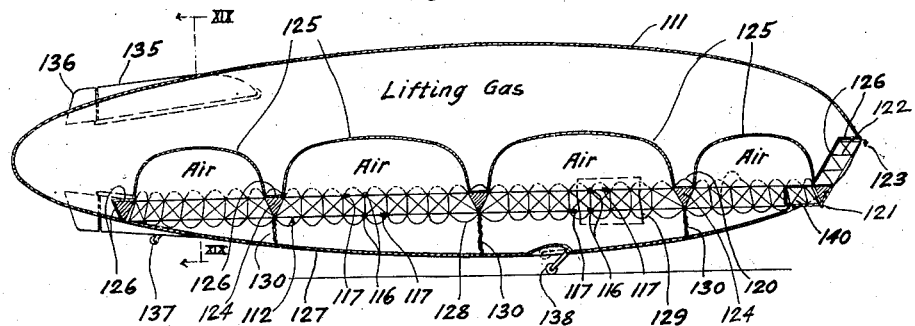
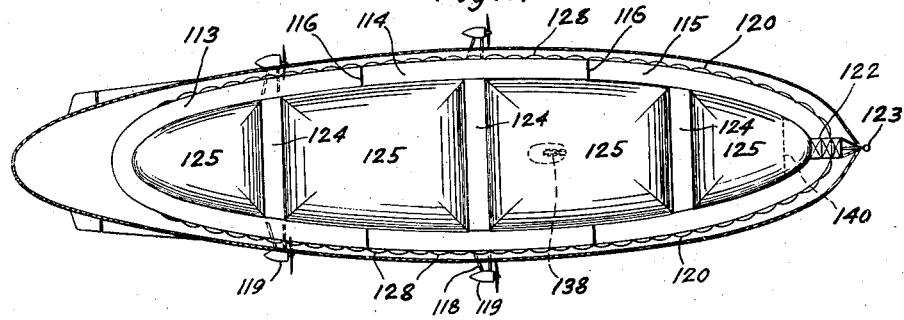
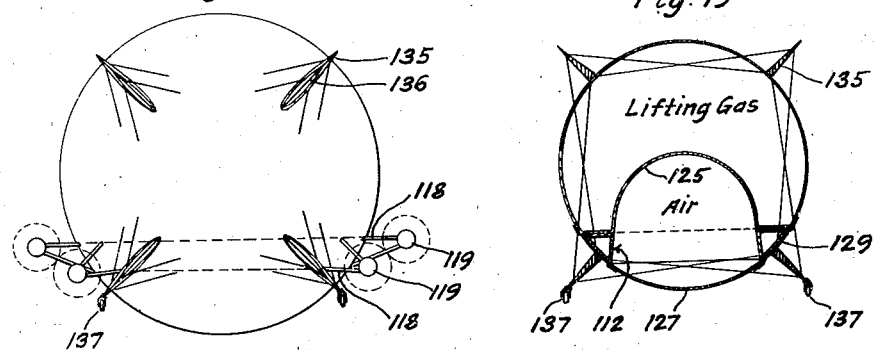
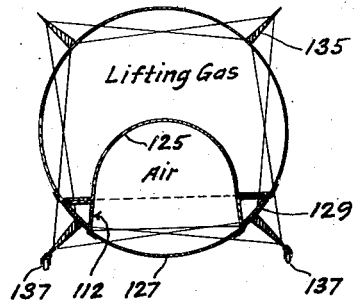
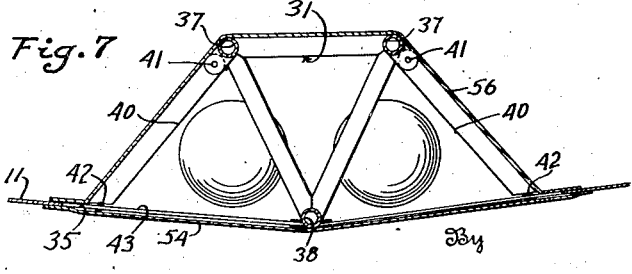

Patented Oct. 19, 1948

2,451,815

UNITED STATES PATENT OFFICE 2,451,815

AIRSHIP

Lloyd H. Donnell, Chicago, Ill., and Elgin L. Shaw, Cuyahoga Falls, Ohio, assignors to Wingfoot Corporation, Wilmington, Del., a corporation of Delaware Original application July 16, 1941, Serial No. 402,586. Divided and this application September 25, 1945, Serial No. 618,562

9 Claims. (Cl. 244—96)

This invention is a division of the patent application, Airships, Serial No. 402,586, filed July 16, 1941, now Patent No. 2,396,494 of March 12, 1946, and relates in particular to the construction of the empennage.

The conventional empennage arrangement of airships consists of a pair of horizontal and vertical fins to each pair of which are attached control surfaces functioning as elevators and rudders, respectively. In this case the elevators as well as the rudders are operated separately. On the other hand, the construction according to the invention provides fins having control surfaces hinged thereto which are arranged diagonally, that is, at an angle to the horizontal plane. With this arrangement there are no separate elevator and rudder surfaces. Instead, when turning either one of the two control wheels all control surfaces move at once as elevator controls or as rudder controls, respectively, and when turning both control wheels in the same or opposite direction a combination of these functions will be the result.

The general object of this invention is to improve the control and operation of the airship in the air as well as on the ground.

Another object of this invention is to permit the start of the airship at relatively large angle with the horizontal plane without damage to control surfaces and fins.

Another object of this invention is to increase the rudder force in vertical or in horizontal direction, as the case may be, by employing in each case all the control surfaces simultaneously by the operation of only one of the control wheels.

Another object of this invention is to permit a far greater vertical distance of the lowest point of the fins or control surfaces from the lowest point of the greatest diameter of the gas container or hull.

For a better understanding of this invention, reference will now be made to the accompanying drawings of which:

Figures 1 and 1a are a vertical longitudinal section taken through the center of the airship.

Fig. 3 represents in enlarged scale, a flexible joint of the longitudinal corridor at points A.

Figure 4:
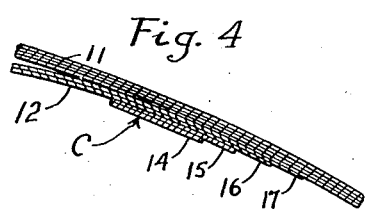

Fig. 4, also in enlarged scale, is a longitudinal section through the outer cover at the points B and C of Figures 1 and 1a, respectively.

Figure 5:
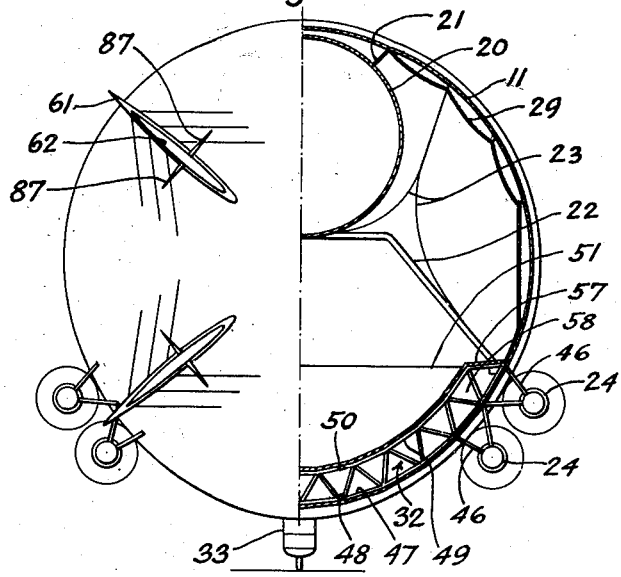

Fig. 5, left side, is a rear view of the airship, and the right side is a cross-section taken on the line V—V in Fig. 1.

Figure 6:
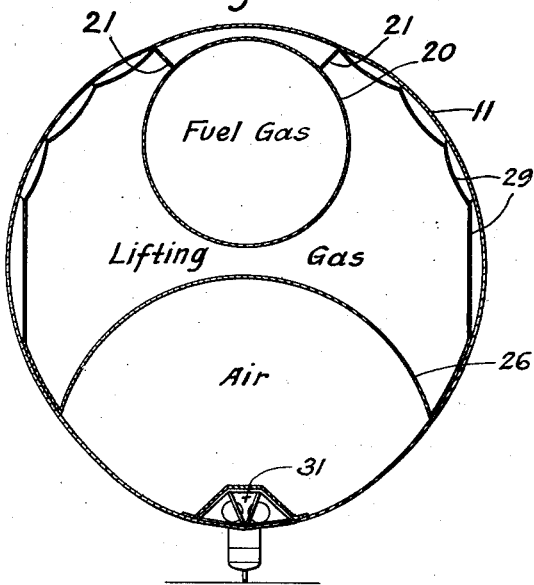

Fig. 6 is a cross-section taken on the line VI—VI in Fig. 1a.

Fig. 7 is a cross-section in enlarged scale of the corridor as shown in Fig. 6.

Fig. 8 is a diagrammatic view of the rudder and elevator control, operated mechanically.

Fig. 9 is a modification of this control, operated hydraulically.

Fig. 10 is a diagram showing the position of the control surfaces when operated as elevators only, the arrow indicating the direction in which the stern moves.

Fig. 11 is a diagram showing the position of the control surfaces when operated as rudders only, the arrow indicating the direction in which the stern moves.

Figs. 12 and 13 are diagrams showing the position of the control surfaces as a result of operating the rudder and elevator worm shafts at the same speed, the arrow indicating the direction in which the stern moves.

Figure 14:
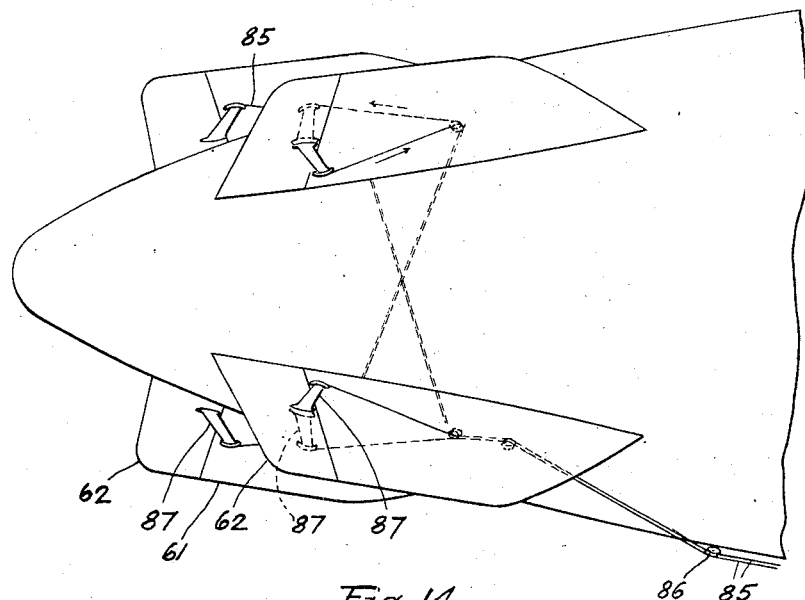

Fig. 14 is a perspective view of the empennage of the airship showing more clearly the connection of the control lines to the control surfaces.

Figure 15:
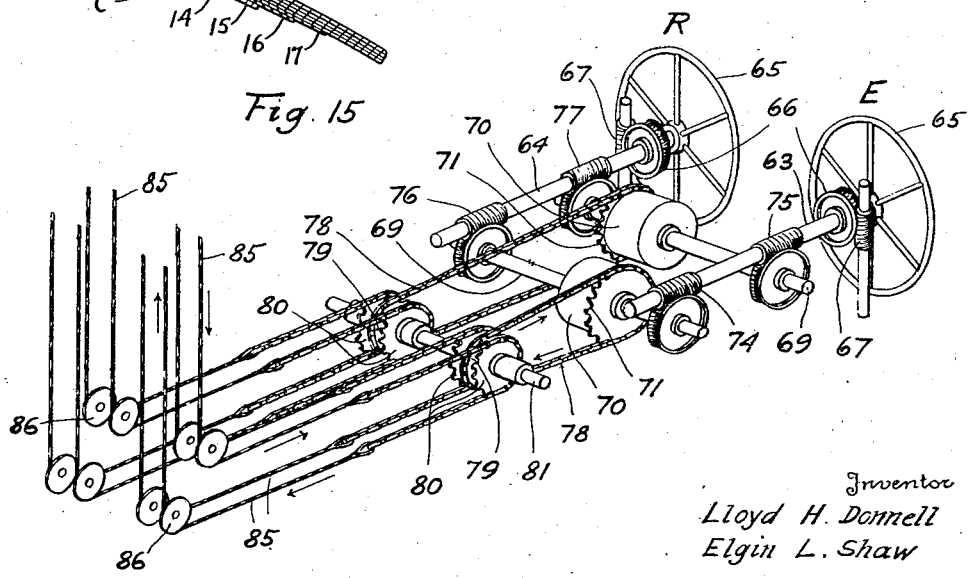

Fig. 15 is a perspective view in larger scale, of the rudder and elevator surface control mechanism.

Fig. 16 is a vertical longitudinal section of a modification of the airship construction shown in Figures 1 and 1a.

Fig. 17 is a horizontal section taken on the center line of Fig. 16.

Fig. 18 is a rear end view of Fig. 16; and

Fig. 19 is a cross-section taken on the line XIX—XIX of Fig. 16.

Referring to the drawings, numeral 11 represents the outer gas bag or envelope of the airship which is provided with spherical bulkheads 12 and 13 located at the bow and at the stern, respectively. Each one of these bulkhead forms, together with the front and rear portion respectively of the envelope 11, a separate gas container which is kept at about twice the pressure as that in the main gas space to make the bow and stern sufficiently resistant against aerodynamic forces acting upon them, thereby dispensing with the conventional air resistance creating battens on the outside of the envelope. In order to secure a smooth outer shape of the envelope and to avoid bulging of some where the bulkheads 12 and 13 are connected to it, that is, where the difference in pressure on the envelope occurs, inner reinforcing strips 14 and 15, made of different widths, are staggered like the edges 16 and 17 of the bulkheads, thus gradually decreasing again the wall of the envelope towards the ends to its normal thickness. Airbags 18 and 19, respectively, control the pressure in the front and rear gas cells. Within the envelope 11 a fuel gas container 20, suspended by aprons 21 from the top of the envelope, is provided with an inflation line 22 (see Fig. 5) suspended by supports 23, and feeds the power units 24. The space which becomes free while the fuel gas is being consumed is taken up by air forced into the bags 25 and 26 which keep the main envelope always in taut condition. Bulkheads 27 divide the fuel gas container into several compartments to reduce surging of the gas. For the same purpose also the larger airbag 26 is provided with a bulkhead 28. To protect the lifting gas against superheat, loose curtains 29 (Fig. 5), made of light gas-proof fabric, are suspended just a short distance away from the airship envelope. These curtains also are to serve the purpose to automatically seal the envelope against loss of gas in case of injury.

The structural portion of the airship consists of a longitudinal gangway framework 31 of triangular cross-sectional shape extending inside along the bottom in the center of the airship and of a transverse triangular gangway 32.

The longitudinal gangway carries practically all the service loads of the airship distributed over its length, like liquid fuel, oil, ballast, etc. and the control car 33 is attached underneath. This car is equipped with a retractable landing wheel 34. If desired, airplanes may also be suspended from this gangway as indicated in dotted lines in Figures 1 and 1a.

One of the new features of this airship construction is that the load carrying longitudinal gangway is entirely supported by catenaries 35 extending circumferentially from the gas envelope without requiring any interior suspension members. To combine the advantages of a non-rigid airship with that of a rigid gangway structure this rigid structure is made in four sections 36 telescoping into each other as in Fig. 3. The chord members 37 and 38 of these sections are provided at one end with welded-in stubs 39 (Fig. 3) which are made with sufficient clearance as to be easily slidable in the chord members of an adjacent gangway section. Thus, the slidable joints are made sufficiently transversally flexible to permit the gangway to follow the changing shape of the airship envelope during flight without creating undue stresses in the structure which, therefore, can be made relatively light in weight. This joint construction, though not capable of resisting bending, tension and compression forces, can transmit shear forces. Laterally the longitudinal gangway is braced by struts 40 (see Fig. 7) which are jointed pivotally at their inner ends at 41 to the upper chord member 37 of the gangway, and their outer ends 42 are connected by braces 43 made of wire or cable to the lower chord member 38. These braces 43 also connect to the catenaries 35 of the envelope.

Figure 2:
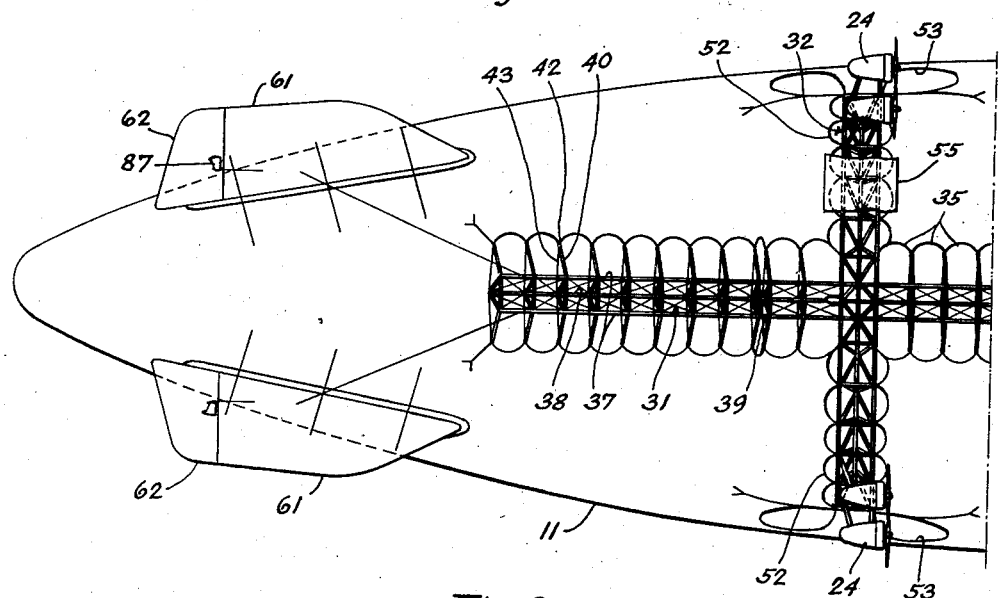
Figures 2 and 2a are bottom views of Figures 1 and 1a, respectively, with most of the outer cover along the gangways omitted.
Figure 2A:
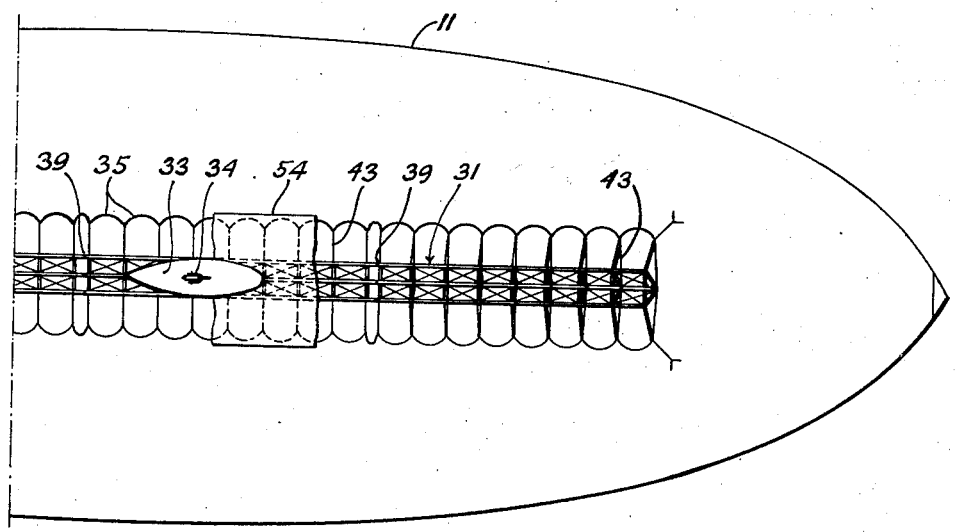

The construction of the transverse gangway 32 to which are attached outriggers 46 carrying the power units 24 is similar to that of the longitudinal gangway, however, with the difference that its outer chord members 47 are hinged to the longitudinal gangway as at 48, and only the inner chord member 49 is made slidable at 50 similar to the construction shown in Fig. 3, giving the transverse gangway the necessary flexibility. A cable 51 connects the top ends of the transverse gangway to limit their spreading apart. The transverse gangway is supported by the envelope by means of catenaries 52 (see Figures 2 and 2a). Catenaries 53 near the equator in the side of and tangentially to the envelope take up the propeller thrust and most of the engine weight. The openings between the gangway catenaries are closed by covers 54 and 55 respectively, which are laced and sealed to the envelope. On the inside, the bottom gangway structure is enclosed by a fabric covering 56 (see Fig. 7), and fireproof coverings 57 (see Fig. 5) enclose portions of the side gangways to provide for engine control rooms 58.

Another new feature of this airship construction is the diagonal arrangement of the empennage consisting of fins 61 and of control surfaces 62. This arrangement has the advantage that injuries to the control surfaces due to take-offs and landings are less likely to occur than is the case with the conventional empennage arrangement. Thus, a steeper take-off is possible which is necessary when starting with overloads. With this new arrangement all four control surfaces are operated simultaneously, either from the control car at 33 or from the rear end of the gangway 36 from one handwheel, either as elevators or as rudders, respectively. Therefore, in each case a larger control surface area is available. However, due to the diagonal arrangement of the surfaces only a component of the force acting on them is effective, either vertically or horizontally. Whereas, when both handwheels are operated, say at the same speed, always one pair of surfaces lying in the same plane is counteracted in its movements by opposite operating forces and thus remains in zero position; but the other pair of surfaces, because both wheels tend to rotate them in the same direction, are deflected at an angle twice as large as when all four surfaces are deflected simultaneously.

Fig. 8 illustrates an example of a control mechanism for the elevators and rudders of which 63 and 64 are worm shafts operated either by handwheels 65 or by worm gears 66 in engagement with worms 67 driven by servo motors (not shown). The worm shafts 63 and 64 operate upon differential shafts 68 and 69, respectively, on each of which is mounted a differential gear 70 provided with a sprocket 71. The worms 74 and 75 on the elevator worm shaft at E are both right hand, whereas the worms 76 and 77 on the rudder worm shaft at R are right hand and left hand, respectively. The sprockets 71 of both differential gears work by chains 78 upon sprockets 79, each of which being fixedly connected to a pair of sprockets 80 and revolving together loosely about a fixed transmission shaft 81. Control lines 85 operate over the sprockets 80 and sheaves 86 to actuate the levers 87 to thus control the surfaces 62. Both pairs of control surfaces can be operated together by either the worm shaft 63 only as elevators or by the worm shaft 64 only as rudders. When operating both worm shafts at the same time the movement of one pair of surfaces, due to the differential gears will be accelerated in the same direction and the angle of deflection increased proportionately, and that of the other pair will be accordingly retarded or completely nullified, depending on the speed and direction of rotation of the worm shafts.

A modification of the elevator and rudder control, described above, is illustrated by Fig. 9, in which the mechanical control is substituted by a hydraulic type.

The operating spindles 91 at E and 92 at R, one operating the control surfaces as elevators and the other one operating these same surfaces as rudders, are made to turn either by hand or by servo motor as described for mechanical control. Each spindle turning in a bearing 93, located between and connecting a pair of hydraulic cylinders 94, engages a crosshead 95, both ends of which are linked to piston rods 96 for moving the pistons 97 in the cylinders 94. On the other hand the levers or segments 87 of each control surface are connected similarly as shown in Fig. 8, by cables trained over pulleys 86 to opposite ends of a piston rod 101 of the piston 102 moving in the transmission cylinder 103 so that when the piston is moved the control surface 62 is deflected accordingly. Corresponding ends of each pair of these cylinders pertaining to a pair of control surfaces which swing about the same axis are connected by a hose or pipe line 104. In order to manipulate from one operating spindle, for instance, the elevator spindle E, all control surfaces at once, the ends of one operating cylinder are connected to the lines 104 of one pair of transmission cylinders, and the ends of the other operating cylinders are connected to the lines 104 of the other pair of transmission cylinders by lines 105 in such a way that when the operating spindle is turned the transmission liquid, by means of the pistons of the transmission cylinder, causes all control surfaces to deflect in one direction, that is, either up or down, depending on which way the spindle is turned (see Fig. 10).

The operating cylinders at R are also connected to the lines 104, but in such a way that when their pistons move one pair of control surfaces deflects upwardly and the other pair downwardly and in opposite directions, respectively, depending on the direction in which the spindle turns. That is, because in this case the connections at 104 of the lines 105 coming from the cylinder 94 at the right side are reversed as compared with the connections of the lines 105 coming from the left cylinder 94, and therefore the control surfaces act as rudders (see Fig. 11). The arrow indicates the direction in which the stern of the airship will move.

When operating both the elevator control E and the rudder control R, at the same speed, two operating pistons, one from E and the other one from R, work upon one pair of control surfaces in the same direction causing a 100% of the possible deflection (see Figs. 12 and 13), whereas the two other operating cylinders are cut short. In other words, the liquid in the front chamber of one of these operating cylinders is pushed into the rear chamber of the other operating cylinder and vice-versa. Therefore, no forces are acting upon the other pair of control surfaces and it remains in its position. The deflected pair of control surfaces then acts simultaneously as an elevator and as a rudder and the ship will move in vertical and in transverse direction. Of course, when turning both spindles simultaneously but at a different rate of speed a lesser percentage of deflection than 100% of the one pair of surfaces, and some deflection of the other pair of surfaces, will be the result. It is seen, that this hydraulically operated control acts exactly like a mechanically operated control.

A simplified modification of this invention adaptable particularly for airships of smaller size is illustrated by the Figures 16 to 19, in which the numeral 111 represents the flexible bag containing the lifting gas. A load carrying gangway 112 of triangular cross-section is made up of sections 113, 114 and 115, which are connected by hinges 116 and by transversally flexible sliding joints 117 similar to that shown in Fig. 3, to permit the gangway to yield vertically sufficiently to adapt itself to eventual deformations of the gas bag and to prevent undue stresses in the rigid structure. The gangway which is oblong in shape carries all loads including the outriggers 118 which support the power plants 119, and is suspended entirely by the catenaries 120 extending from the edge along the bottom of the gas bag. The position of the gangway is located considerably below and substantially parallel to the equator of the airship and its outer contour corresponds substantially to that of the gas bag, except at the rear end where it emerges into the gas bag and at the front where it somewhat protrudes the gas bag to provide for a suitable mooring point 121. In front at the center of the gangway a girder 122 extends upwardly and forwardly as far as the center of the bow where a mooring cone 123 is attached. Horizontally, the gangway is braced by transverse keel girders 124 which also serve as gangways from one side of the airship to the other. At the outside of the lateral gangways, where the transverse braces connect, the four engine outriggers 118 are attached. Along the inside upper edge of the gangway girders and along the upper edges of the transverse girders air ballonets 125 are attached, and sealing strips 126 cover these girders to make the gas bag gas-tight at the bottom. The bottom cover 127 of the airship which closes the airbags against the outside is fastened by means of catenaries 128 to the bottom edge of the gangway 112. The open space between the catenaries of the gas bag and those of the airbags is sealed by cover strips 129. Diaphragms 130 divide the air space into four compartments to prevent too much surging of the air and to secure better maneuverability of the airship.

The four fins 135 and control surfaces 136 are arranged in the same way as described for the earlier presented construction. A landing wheel 137 is attached to each one of the bottom fins for their protection, and a retractable landing wheel 138 is built into and underneath the bottom cover which acts as a landing cushion.

The control room 140 from which the airship is being operated is located at the front of and between the lateral gangway girders.

Having described this invention in detail, it is to be understood that its construction is not limited to the examples presented and illustrated, but that many changes and combinations may be made without departing from the spirit and scope of this invention as defined by the attached claims.

We claim:

1. An airship comprising a hull, an empennage carried by the stern of said hull, said empennage consisting of two pairs of fins the planes of which cross each other, including a control surface hinged to the end of each fin, the pairs of fins being arranged at an angle to the horizontal, an elevator control spindle and a rudder control spindle, two sprocket-equipped differential gears each of which being in operative engagement with both of said control spindles, two sets of freely rotating transmission sprockets, one of said sets being driven by the one differential sprocket and the other set of sprockets being driven by the other differential sprocket, control lines operatively connecting the one set of sprockets to one pair of control surfaces and the other set of sprockets to the other pair of control surfaces.

2. An airship comprising a hull, an empennage at the stern of said hull consisting of two pairs of fins including control surfaces hinged thereto, said pairs of fins being arranged crosswise to each other at an angle of about 40° to 45° to the horizontal, an elevator control shaft, a rudder control shaft, and power transmission means between said shafts and said surfaces constructed and arranged for simultaneously actuating all of said surfaces by each one of said control shafts, that is, as elevators and as rudders, respectively.

3. An airship comprising a hull, an empennage at the stern of said hull consisting of two pairs of fins including control surfaces hinged thereto, said pairs of fins being arranged crosswise to each other at an angle of about 40° to 45° to the horizontal, an elevator control shaft, a rudder control shaft, and power transmission means between said shafts and said surfaces constructed and arranged for simultaneously actuating all of said surfaces by each one of said control shafts, that is, as elevators and as rudders, respectively, and also simultaneously by both shafts as a combination of elevators and rudders.

4. An airship comprising a hull, an empennage at the stern of said hull consisting of two pairs of fins including control surfaces hinged thereto, said pairs of fins being arranged crosswise to each other at an angle of about 40° to 45° to the horizontal, an elevator control shaft, a rudder control shaft, and mechanical power transmission means between said shafts and said surfaces constructed and arranged for simultaneously actuating all of said surfaces by each one of said control shafts, that is, as elevators and as rudders, respectively.

5. An airship comprising a hull, an empennage at the stern of said hull consisting of two pairs of fins including control surfaces hinged thereto, said pairs of fins being arranged crosswise to each other at an angle of about 40° to 45° to the horizontal, an elevator control shaft, a rudder control shaft, and hydraulic power transmission means between said shafts and said surfaces constructed and arranged for simultaneously actuating all of said surfaces by each one of said control shafts, that is, as elevators and as rudders, respectively.

6. An airship comprising a hull, an empennage at the stern of said hull consisting of two pairs of fins including control surfaces hinged thereto, said pairs of fins being arranged crosswise to each other and each pair being normally disposed in a single plane and at an angle to the horizontal, an elevator control shaft, a rudder control shaft, and power transmission means between said shafts and said surfaces constructed and arranged for simultaneously actuating all of said surfaces by each one of said shafts, that is, as elevators and as rudders, respectively, as well as by both shafts as a combination of elevators and rudders.

7. An airship comprising a hull, two pairs of fins including control surfaces disposed at the stern of said hull and positioned substantially at angles of 40° to 45° to the horizontal, a control mechanism for actuating said surfaces, said mechanism including two control shafts each one having separate driving means, power transmission means between said control shafts and said surfaces constructed and arranged to actuate all of said surfaces from each one of said shafts in such a way that when actuated from the one shaft all of said surfaces function as elevators, but when actuated from the other one of said shafts, all of said surfaces function as rudders, and when simultaneously actuated from both of said shafts, said surfaces function as a combination of elevators and rudders.

8. An airship comprising a hull, two pairs of fins, a control surface hinged to each fin all of which being simultaneously operated as elevators and as rudders, respectively, said pairs of fins being arranged crosswise to each other and being positioned at angles of substantially 40° to 45° to the horizontal, a control mechanism constructed and arranged to be operated manually and by motor power, respectively, for actuating said surfaces, said mechanism including two worm shafts each of which having two worms, the worms of the one shaft being threaded in one direction for operating the surfaces as elevators, and the worms of the other shaft being right and left handed, respectively, for operating the surfaces as rudders, and when operating both shafts together the surfaces function as a combination of elevators and rudders, two differential shafts, each one consisting of two separate shanks, each one including a worm wheel at its outer end in operative engagement with a corresponding worm, a differential gear assembly including a sprocket freely rotatable about each one of said differential shafts and operatively engaging therewith; a fixed transmission shaft parallel to said differential shafts, two sets of three sprockets each, each set having a common hub rotatable about said transmission shaft, one sprocket of each one of said sets being operatively connected with the sprocket of one of said differential gear drives, and two sprockets of each one of said sets being operatively connected with one pair of control surfaces lying in the same plane, respectively, for deflecting said surfaces to either side from the zero position.

9. An airship comprising a hull, an empennage at the stern of said hull including two pairs of control surfaces arranged crosswise to each other and each pair being normally disposed in a single plane and at an angle to the horizontal, an elevator control spindle and a rudder control spindle, two pairs of hydraulic operating cylinders including pistons and rods, the piston rods of one pair of these cylinders being operatively connected with the elevator operating spindle and the piston rods of the other pair of these cylinders being connected in the same way with the rudder operating spindle, four transmission cylinders including piston and rods, the ends of each transmission piston rod being in operative engagement with a corresponding control surface, a liquid carrying line system connecting the ends of one of the elevator operating cylinders with the ends of one pair of the transmission cylinders and connecting the ends of the other elevator operating cylinder with the ends of the other pair of the transmission cylinders in such a way that when the elevator spindle is turned the pairs of the control surfaces deflect symmetrically to the vertical center line and similarly connecting the rudder operating cylinders with the transmission cylinders but so that when operating the rudder spindle the pairs of control surfaces deflect symmetrically to the horizontal center line.

LLOYD H. DONNELL.
ELGIN L. SHAW.

REFERENCES CITED

The following references are of record in the file of this patent:

UNITED STATES PATENTS

| Number | Name | Date |
| --- | --- | --- |
| 1,750,141 | Upson | Mar. 11, 1930 |
| 1,836,681 | Palmquist | Dec. 15, 1931 |